United States Patent
Li (10) Patent No.: US 12,082,656 B2
(45) Date of Patent: Sep. 10, 2024

(54) ADJUSTABLE BUCKLE APPARATUS

(71) Applicant: LIAN YANG PLASTIC (SHENZHEN) CO., LTD., Guangdong (CN)

(72) Inventor: Qiuzong Li, Guangdong (CN)

(73) Assignee: LIAN YANG PLASTIC (SHENZHEN) CO., LTD., Shenzhen (CN)

( * ) Notice: Subject to any disclaimer, the term of this patent is extended or adjusted under 35 U.S.C. 154(b) by 154 days.

(21) Appl. No.: 17/792,749

(22) PCT Filed: Feb. 22, 2021

(86) PCT No.: PCT/CN2021/077320
§ 371 (c)(1),
(2) Date: Jul. 14, 2022

(87) PCT Pub. No.: WO2021/143940
PCT Pub. Date: Jul. 22, 2021

(65) Prior Publication Data
US 2023/0044466 A1    Feb. 9, 2023

(30) Foreign Application Priority Data

Jan. 14, 2020  (CN) .......................... 202010039246.5
Apr. 13, 2020  (CN) .......................... 202010287149.8

(51) Int. Cl.
A44B 11/02    (2006.01)
A44B 11/25    (2006.01)
B60N 2/28     (2006.01)

(52) U.S. Cl.
CPC .......... *A44B 11/02* (2013.01); *A44B 11/2503* (2013.01); *B60N 2/2887* (2013.01)

(58) Field of Classification Search
CPC ... A44B 11/02; A44B 11/2503; A44B 11/125; B60N 2/2887
See application file for complete search history.

(56) References Cited

U.S. PATENT DOCUMENTS

2003/0172499 A1* 9/2003 Uehara .................. A44B 11/12
                                                                      24/170

FOREIGN PATENT DOCUMENTS

CN    109123923 A    1/2019
CN    209846278 U    12/2019

OTHER PUBLICATIONS

International Search Report of PCT Patent Application No. PCT/CN2021/077320 issued on May 26, 2021.

* cited by examiner

Primary Examiner — David M Upchurch (57) ABSTRACT

Provided is an adjustable buckle apparatus, which includes a buckle base and an adjustment assembly, the adjustment assembly being movably arranged on the buckle base; when the adjustment assembly moves from a first position to a second position, the adjustment assembly can be linked to a connecting strap so as to change the length of the connecting strap within the buckle base; when the length of the connecting strap within the adjustable buckle apparatus increases, the connecting strap located between a child safety seat and an automobile seat can be rapidly tightened, so as to constraint the child safety seat stably.

15 Claims, 6 Drawing Sheets

ADJUSTABLE BUCKLE APPARATUS

TECHNICAL FIELD

The present invention relates to the field of machinery, in particular to an adjustable buckle apparatus.

BACKGROUND ART

A child safety seat is a seat that is connected to an automobile seat for a child to ride in and constrains the child riding in the child safety seat by means of a safety belt to ensure safety of the child. A child safety seat is rapidly gaining acceptance and popularity since it may minimize injuries to children in the event of an emergency braking or accidental collision.

To ensure safety of the child safety seat, the child safety seat is generally installed stably in the automobile seat to prevent shaking of the child safety seat. The installation of the child safety seat is usually achieved by using an ISO FIX connector on the automobile seat and a corresponding connector on the child safety seat.

The child safety seat is usually set with a connecting strap that is difficult to remove by the user. The port of the connecting strap is provided with a plug that matches the ISO FIX connector. During installation, the length of the connecting strap is roughly adjusted and then the plug is inserted into the ISO FIX connector, thereby allowing the child safety seat to be connected to the automobile seat.

During practical operating process, if the plug at the end part of the safety belt is directly inserted into the ISO FIX connector, it is usually not possible to ensure that the child safety seat does not shake, such that during conventional installation, it may not be ensured that the connecting strap is fully tightened, which will certainly cause the installed child safety seat to shake. In order to avoid a slack margin of the connecting strap during installation, the user is required to install the safety seat in a special way and at a special angle, and certain installation techniques are required to ensure that the child safety seat does not shake. As to such a manner, the installation is difficult and requires a lot of efforts, which may not be learned and mastered by ordinary users, therefore, a number of solutions to this problem are now available on the market.

Among them, in more common solutions, a winding mechanism is arranged on the connecting strap, which may wind up the connecting strap (similar to the winding of a tape measure), and wind the loosened connecting strap into the winding mechanism to make the connecting strap in a tightened state. The winding mechanism is usually provided with a hand-cranking handle. When the hand-cranking handle is shaken, the connecting strap may be wound, such that the connecting strap connected between the automobile seat and the child safety seat is in a tightened state, so as to prevent the child safety seat from shaking. This solution is convenient for the user to operate to a certain extent. The user may easily tighten the connecting strap by hand cranking to ensure the stability of the child safety seat. However, there are still some problems: the winding mechanism has a complex structure, needs to tighten the safety belt, and has high requirements in strength. Therefore, the cost of the entire winding mechanism will be greatly increased; in addition, to tighten the connecting strap by hand cranking, the user needs to manually shake for many times before tightening the connecting strap. The tightening efficiency is slightly low, and it is not convenient for the user to rapidly tighten the connecting strap to achieve rapid installation. On the other hand, when the connecting strap needs to be loosened and the child safety seat is removed from the automobile seat, the user needs to shake in a reverse direction to complete the loosening of the connecting strap. Generally, the operation is slow and the efficiency is low.

SUMMARY OF THE INVENTION

The present invention aims at solving the above problem, and provides an adjustable buckle apparatus which is convenient to use and may rapidly tighten a connecting strap.

To solve the above problem, the present invention provides an adjustable buckle apparatus which includes a buckle base and an adjustment assembly, wherein the buckle base is provided with a first strap hole through which a connecting strap may be penetrated; and the adjustment assembly is movably arranged on the buckle base, wherein when the adjustment assembly moves from a first position to a second position, the adjustment assembly may be linked to the connecting strap within the buckle base so as to change the stroke length of the connecting strap within the buckle base.

Further, when the adjustment assembly is in the first position, the stroke length of the connecting strap within the buckle base is the first length; when the adjustment assembly is in the second position, the stroke length of the connecting strap within the buckle base is the second length, and the second length is greater than the first length.

Further, the adjustment assembly is rotatably arranged on the buckle base, and when the adjustment assembly rotates from the first position to the second position, the adjustment assembly may be stuck at the second position.

Further, the buckle base and/or the adjustment assembly are/is provided with a movably arranged locking assembly, when the adjustment assembly moves to the second position, the locking assembly may keep the adjustment assembly in the current state.

Further, when the locking assembly is released, the adjustment assembly may move towards the direction of the first position under the action of the connecting strap in a tightened state.

Further, when the adjustment assembly is in the first position, the connecting strap may freely penetrate through the buckle base and the adjustment assembly may be freely pulled.

Further, when the adjustment assembly is in the second position, the adjustment assembly may clamp the connecting strap, such that the connecting strap may not be freely pulled.

Further, the adjustment assembly includes a handle, a strap winding shaft and a follower, wherein one end of the handle is rotatably connected with the buckle base, while the other end extends out of the buckle base for operation; the strap winding shaft is arranged transversely between the handles and moves along with the handle; and the follower is rotatably connected with the buckle base, and the follower is provided with a second strap hole and a third strap hole through which the connecting strap may be penetrated.

Further, when in use, the connecting strap is wound around the strap winding shaft and penetrates through the follower; when the handle rotates, the strap winding shaft follows the movement of the handle and pulls the connecting strap to rotate the follower, and the state of the follower changes such that the stroke length of the connecting strap is increased.

Further, the handle and the follower are respectively rotatably connected to the buckle base by means of a first rotating shaft; and the first rotating shaft is arranged between the first strap hole and the strap winding shaft arranged in the first position.

Further, a rotating pivot point of the follower is arranged between the first strap hole and the strap winding shaft arranged in the first position.

Further, the buckle base is provided with an arc-shaped stroke hole, the handle is provided with a movable hole, and two ends of the strap winding shaft respectively penetrate through the movable hole and are arranged in the stroke hole.

Further, a button member and a locking member are arranged on the handle, and the button member is movably arranged on the handle and is linked to the locking member; two ends of the locking member respectively extend out of the handle, a positioning step which may clamp the locking member is arranged at the position, corresponding to the second position, of the buckle base, and when the adjustment assembly rotates to the second position, the end part of the locking member may be clamped into the positioning step, such that the adjustment assembly is kept in the current state.

Further, a reset elastic member is arranged between the handle and the button member or the locking member, one end of the reset elastic member is abutted against an inner wall of the handle, and the other end of the reset elastic member 33 is abutted against the button member or the locking member; and when the button member is pushed towards the direction far away from the strap winding shaft, the end part of the locking member exits from the positioning step.

Further, in the first position, the second strap hole is arranged between the first strap hole and the third strap hole; and in the second position, the third strap hole is arranged between the first strap hole and the second strap hole.

Further, an arc-shaped concave part with the shape matching the strap winding shaft is arranged on the follower, when the adjustment assembly is in the first position, the position of the strap winding shaft corresponds to the third strap hole; and when the adjustment assembly is in the second position, the position of the strap winding shaft corresponds to the arc-shaped concave part.

The present invention has the beneficial effects that it effectively solves the above problems. The adjustable buckle apparatus of the present invention changes the stroke length of the connecting strap within the adjustable buckle apparatus by rotating the adjustment assembly. When the stroke length of the connecting strap within the adjustable buckle apparatus is increased, the length of the connecting strap between the child safety seat and the automobile seat will be reduced. In this way, the connecting strap which is originally loosened may be rapidly tightened to ensure stability of the child safety seat and prevent the child safety seat from shaking. The adjustable buckle apparatus of the present invention tightens the connecting strap in a rotating manner, which is not only simple and fast to operate, but also uses the lever principle, thereby saving the operating force of the user, such that the user may complete the operation conveniently and painlessly, and the operation is very humanized. In addition, when the adjustment assembly of the adjustable buckle apparatus rotates in place to tighten the connecting strap, the adjustment assembly may also clamp the connecting strap to prevent the connecting strap from being pulled, thereby further guaranteeing the tightening of the connecting strap, and preventing the child safety seat from shaking since the connecting strap is pulled due to an external force. In addition, when the connecting strap needs to be loosened, only the locking assembly needs to be released, and the originally tightened connecting strap will rapidly be in a loosened state and drive the adjustment assembly to reset rapidly. The adjustable buckle apparatus of the present invention has the advantages of simple structure, high strength, low cost, convenient use, humanized operation, strong practicability, and is suitable to be popularized.

buckle base 10, shell 11, through hole 111, bottom shell 12, base 13, supporting part 131, first shaft hole 1311, stroke hole 1312, positioning step 1313, strap hole part 132, first strap hole 1321, adjustment assembly 20, handle 21, support arm part 211, second shaft hole 2111, movable hole 2112, locking hole 2113, connecting part 212, handle shell 213, first handle shell 2131, second handle shell 2132, key hole 2133, strap winding shaft 22, follower 23, third shaft hole 231, second strap hole 232, third strap hole 233, arc-shaped concave part 234, flat plate part 235, vertical part 236, locking assembly 30, locking member 31, button member 32, reset elastic member 33, connecting strap 40, first rotating shaft 50.

DETAILED DESCRIPTION OF THE EMBODIMENTS

The following embodiments are further explanations and supplements to the present invention and do not constitute any limitations to the present invention.

As shown in FIG. 1 to FIG. 8, the main point of the adjustable buckle apparatus of the present invention lies in that the adjustable buckle apparatus may not only conveniently pull and adjust the connecting strap 40, but also tighten the connecting strap 40 through changing the stroke length of the connecting strap 40 in the adjustable buckle apparatus, such that the child safety seat is constrained more stably without shaking.

Specifically, as shown in FIG. 1 to FIG. 8, the adjustable buckle apparatus of the present invention includes a buckle base 10, an adjustment assembly 20 and a locking assembly 30. Wherein, the buckle base 10 is a basic structural carrier for setting the adjustment assembly 20. The adjustment assembly 20 is movably connected with the buckle base 10, and may move from the first position to the second position. When the position of the adjustment assembly 20 changes, the connecting strap 40 arranged within the buckle base 10 will change its stroke along with the change of the movement state of the adjustment assembly 20, such that the connecting strap 40 is tightened or loosened. The locking assembly 30 is configured to keep the adjustment assembly 20 in the second position and keep the connecting strap 40 in a tightened state, so as to prevent resetting of the adjustment assembly 20 due to the tensile force of the connecting strap 40; when the locking assembly 30 is released, the adjustment assembly 20 may recover to the first position state under the tensile force of the connecting strap 40 after losing the limiting effect, such that the connecting strap 40 is in an incomplete tightened state.

To facilitate operation, the adjustment assembly 20 is operated in a rotating manner, and is rotatably connected to the buckle base 10.

Figure 3:
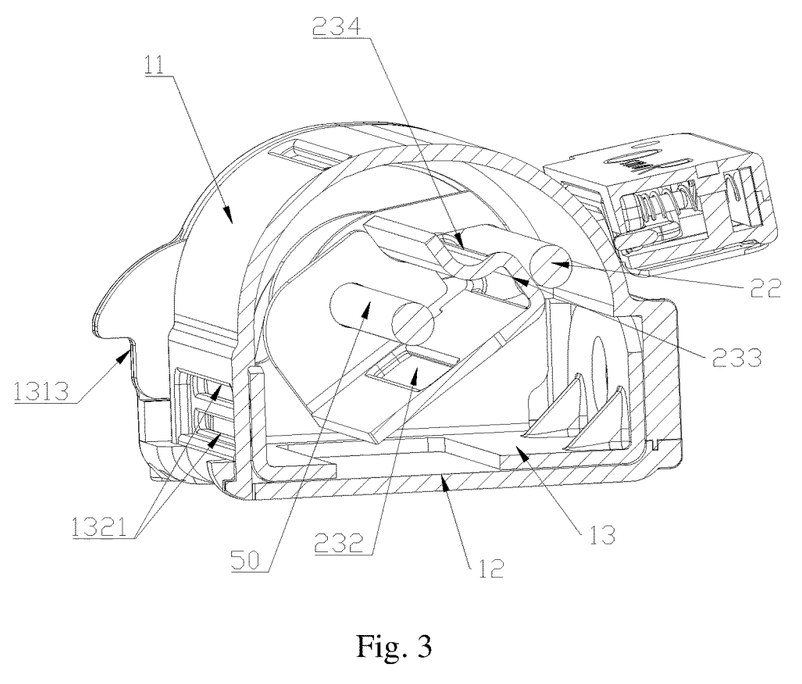
FIG. 3 is a semi-sectional view of an adjustment assembly in a first position.
Figure 4:
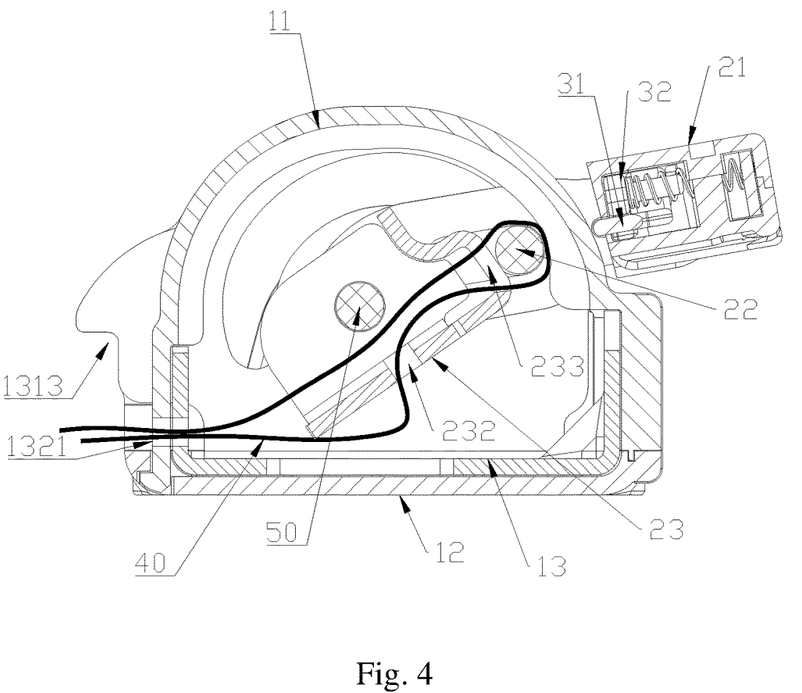
FIG. 4 is a sectional view of an adjustment assembly in a first position.

In a default state, as shown in FIG. 3 and FIG. 4, the adjustment assembly 20 is arranged in the first position, at this time, the connecting strap 40 may be freely pulled, and the effective length of the connecting strap 40 within the buckle base 10 is the first length; when the connecting strap 40 is pulled, the position of the connecting strap 40 changes, however, the effective length of the connecting strap 40 within the buckle base 10 is unchanged.

Figure 5:
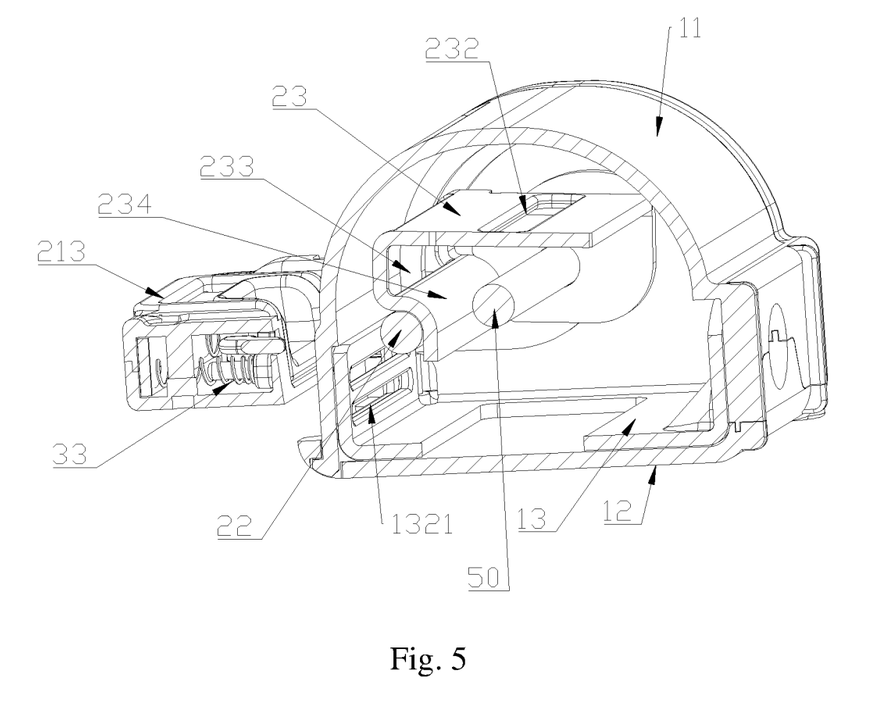
FIG. 5 is a semi-sectional structural schematic diagram of an adjustment assembly in a second position.
Figure 6:
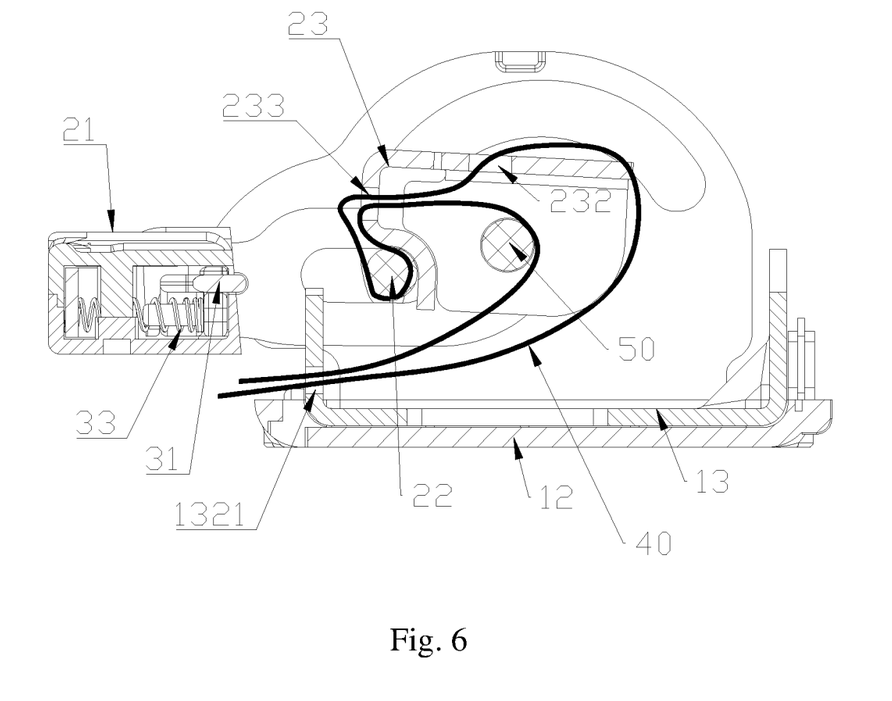
FIG. 6 is a sectional view of an adjustment assembly in a second position.

When the adjustment assembly 20 is rotated such that the adjustment assembly 20 rotates to the second position, as shown in FIG. 5 and FIG. 6, the effective length of the connecting strap 40 within the buckle base 10 is the second length, at this time, the adjustment assembly 20 clamps the connecting strap 40, and the connecting strap 40 may not be freely pulled.

The second length is greater than the first length. When the stroke length of the connecting strap 40 within the buckle base 10 is increased, the effective length of the connecting strap 40 outside the buckle base 10 is reduced, in this way, when the connecting strap 40 is configured to constrain the child safety seat, through turning the adjustment assembly 20, the connecting strap 40 which originally has a certain slack margin may be tightened, such that the child safety seat may not be shaken, thereby ensuring the safety of the child safety seat and improving the ease of operation.

Figure 1:
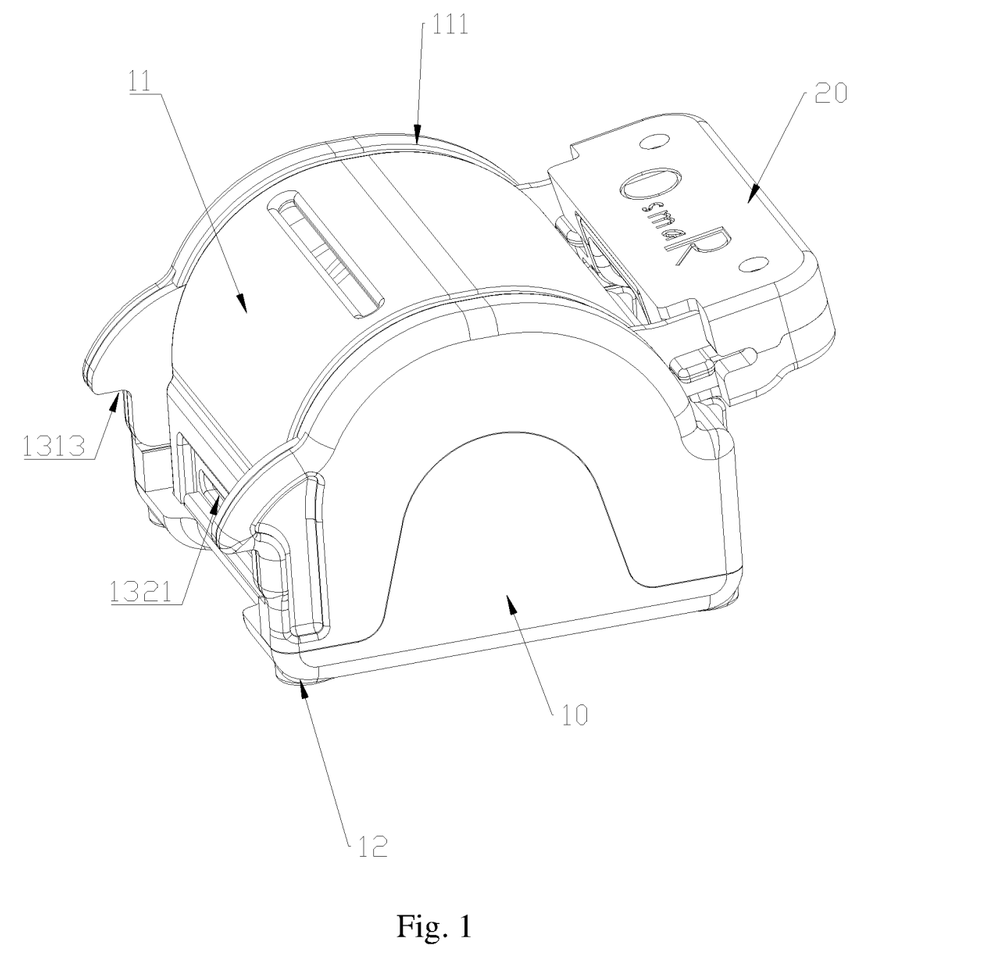
FIG. 1 is a schematic diagram of an overall structure of the present invention.

To introduce the structure of the present invention in more details, introduction will be given below with specific structures:

As shown in FIG. 1, the buckle base 10 includes a shell 11, a bottom shell 12 and a base 13.

As shown in FIG. 1, the shell 11 and the bottom shell 12 are in butt joints, and an accommodating cavity is formed therebetween and is configured to set the base 13. Since the adjustment assembly 20 is rotatably arranged on the buckle base 10, in order to not interfere with the rotation of the adjustment assembly 20, a corresponding through hole 111 is arranged on the shell 11. The size of the through hole 111 is related to the stroke of the adjustment assembly 20.

Figure 2:
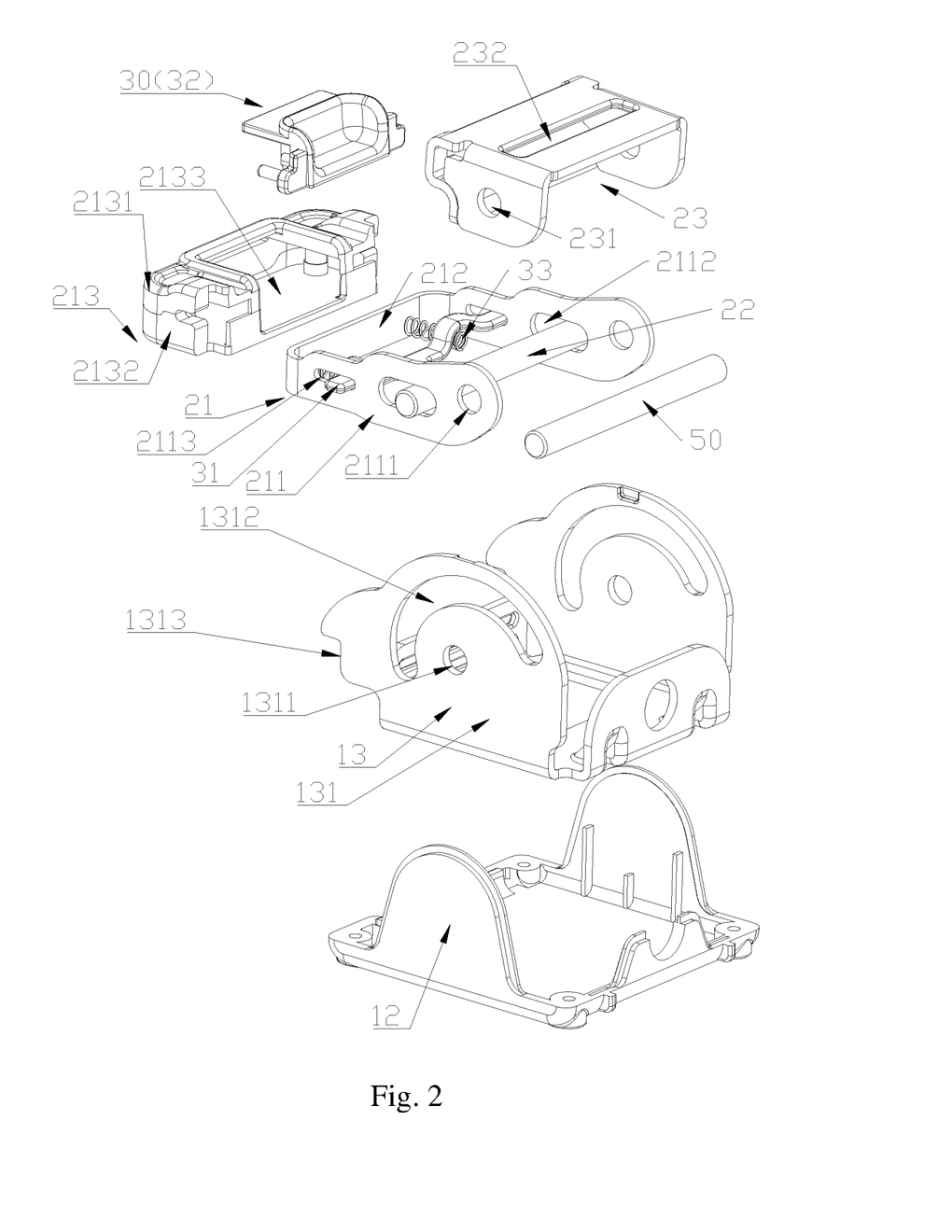
FIG. 2 is a decomposition schematic diagram of an overall structure of the present invention.
Figure 7:
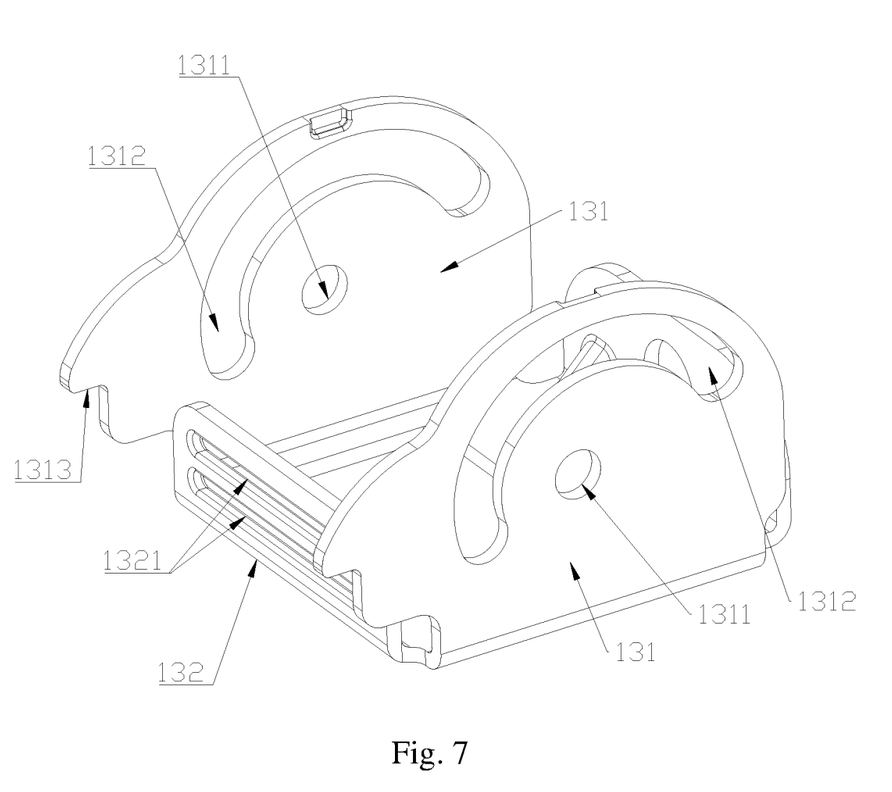
FIG. 7 is a structural schematic diagram of a base.

As shown in FIG. 2, FIG. 3 and FIG. 5, the base 13 is arranged in the space between the shell 11 and bottom shell 12, and is configured to movably set the adjustment assembly 20. As shown in FIG. 7, the base 13 includes supporting parts 131 spaced in parallel and a strap hole part 132 arranged between the supporting parts 131. The supporting part 131 and the strap hole part 132 may be integrally formed or may be formed as separate parts, which may be specifically set according to needs. In the present embodiment, the supporting part 131 and the strap hole part 132 are integrally formed and are made of metal.

As shown in FIG. 2 and FIG. 7, the supporting part 131 is symmetrically provided with a first shaft hole 1311 which is configured to movably arrange the first rotating shaft 50.

As shown in FIG. 2 and FIG. 7, the supporting part 131 is symmetrically provided with stroke holes 1312. The stroke hole 1312 is an arc-shaped hole and is configured to constrain the displacement of the strap winding shaft 22.

As shown in FIG. 2 and FIG. 7, the first shaft hole 1311 is arranged on the arc-shaped center side of the stroke hole 1312. The trajectory of the stroke hole 1312 is related to the rotation trajectory of the adjustment assembly 20.

As shown in FIG. 2 and FIG. 7, the strap hole part 132 is provided with a first strap hole 1321. The first strap hole 1321 is configured to allow the connecting strap 40 to enter the buckle base 10 and allow the connecting strap 40 to extend out of the buckle base 10. The first strap hole 1321 may be a single hole or two holes, which may be specifically set according to needs. When the first strap hole 1321 is provided as one hole, the connecting strap 40 enters therefrom and exits therefrom. In the present embodiment, two first strap holes 1321 are arranged in parallel to each other and one is high and one is low, one of the holes is an inlet hole while the other hole is an exist hole, and the connecting strap 40 enters from the inlet hole and extends from the exit hole.

As shown in FIG. 2 and FIG. 7, in order to facilitate clamping of the adjustment assembly 20 such that the adjustment assembly 20 may be kept in the second position, a positioning step 1313 is arranged on the supporting part 131 and may provide a certain blocking effect and block the resetting of the adjustment assembly 20. The positioning step 1313 is arranged on the side, adjacent to the first strap hole 1321, of the supporting part 131. The shape and size of the positioning step 1313 may be set according to needs.

As shown in FIG. 2, the adjustment assembly 20 includes a handle 21, a strap winding shaft 22 and a follower 23.

The handle 21 is used for operation, one end of the handle 21 is rotatably connected with the base 13 while the other end extends out of the buckle base 10, and the handle 21 may rotate relative to the base 13.

In the present embodiment, as shown in FIG. 2, the handle 21 includes support arm parts 211 spaced in parallel and a connecting part 212 connected to one end of the supporting part 131. The support arm part 211 and the connecting part 212 may or may not be integrally formed, which may be specifically set according to needs. A second shaft hole 2111 is arranged on an end, opposite to the connecting part 212, of the support arm part 211. The support arm part 211 is rotatably connected with the base 13 through the first rotating shaft 50.

As shown in FIG. 2 to FIG. 6, the first rotating shaft 50 is transversely arranged on the base 13, and two ends of the first rotating shaft 50 respectively penetrate through the second shaft hole 2111 and are arranged in the first shaft hole 1311, such that the support arm part 211 may rotate around the first rotating shaft 50.

As shown in FIG. 2, the support arm part 211 is further respectively provided with a movable hole 2112. The movable hole 2112 is configured to set the strap winding shaft 22, to link the strap winding shaft 22.

As shown in FIG. 2 to FIG. 6, the strap winding shaft 22 is transversely arranged on the support arm part 211, and two ends of the strap winding shaft 22 respectively penetrate through the movable hole 2112 and extend into the stroke hole 1312 in the base 13. When the handle 21 rotates around the first rotating shaft 50, the strap winding shaft 22 moves within the limiting range of the stroke hole 1312.

As shown in FIG. 2, a locking hole 2113 is further arranged on an end, adjacent to the connecting part 212, of the supporting part 211. The locking hole 2113 is configured to set the locking member 31 of the locking assembly 30.

In a default state, as shown in FIG. 3 and FIG. 4, the follower 23 is arranged between the strap winding shaft 22 and the first strap hole 1321. The follower 23 is rotatably connected to the base 13. In the present embodiment, the rotating pivot point of the follower 23 coincides with the rotating pivot point of the handle 21, both of which rotate around a first rotating shaft 50. The follower 23 is provided with a third shaft hole 231, which is sleeved on the first rotating shaft 50 and may rotate around the first rotating shaft 50. In other embodiments, the rotating pivot point of the follower 23 may not coincide with the rotating pivot point of the handle 21.

Figure 8:
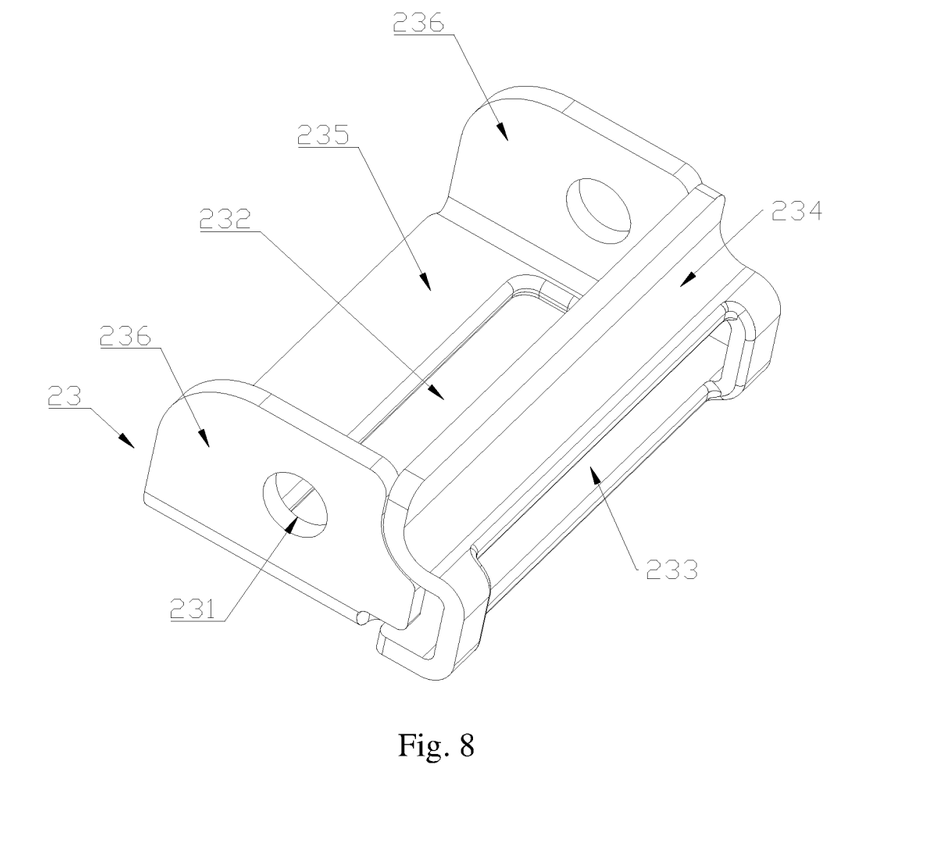
FIG. 8 is a structural schematic diagram of a follower.

As shown in FIG. 2 and FIG. 8, the follower 23 is provided with a second strap hole 232 and a third strap hole 233. The second strap hole 232 and the third strap hole 233 are positioned differently, wherein the second strap hole 232 is configured to allow the connecting strap 40 to pass in one direction and the third strap hole 233 is configured to allow the connecting strap 40 to pass in both directions.

Further, as shown in FIG. 2 and FIG. 8, an arc-shaped concave part 234 is further arranged on the follower 23, the arc-shaped concave part 234 matches the shape of the strap winding shaft 22, and may be fit to the strap winding shaft 22. The arc-shaped concave part 234 is adjacent to the third strap hole 233.

As shown in FIG. 3 and FIG. 4, when the adjustment assembly 20 is arranged in the first position, the second strap hole 232 is arranged between the first strap hole 1321 and the third strap hole 233, and the third strap hole 233 corresponds to the strap winding shaft 22. As shown in FIG. 5 and FIG. 6, when the adjustment assembly 20 rotates to the second position, the third strap hole 233 is arranged between the first strap hole 1321 and the second strap hole 232, and the strap winding shaft 22 corresponds to the arc-shaped concave part 234.

The shape of the follower 23 may be set according to needs, in the present embodiment, as shown in FIG. 8, the follower 23 includes a flat plate part 235 shaped like a flat plate and vertical parts 236 vertically arranged on two sides of the flat plate part 235. In the present embodiment, the flat plate part 235 and the vertical part 236 are integrally formed. The second strap hole 232 is arranged on the flat plate part 235. The vertical part 236 is rotatably connected to the base 13 by means of a first rotating shaft 50. The second strap hole 232 is nearly parallel or parallel to the first rotating shaft 50. The arc-shaped concave part 234 is arranged on the end part of the flat plate part 235 and the vertical part 236, and a third strap hole 233 is arranged at the position adjacent to the arc-shaped concave part 234. The third strap hole 233 is parallel to the first rotating shaft 50.

To facilitate to keep the adjustment assembly 20 in the second position, a locking assembly 30 is arranged on the adjustment assembly 20. Specifically, the locking assembly 30 is arranged on the connecting part 212 of the handle 21.

As shown in FIG. 2, the locking assembly 30 includes a button member 32, a locking member 31 and a reset elastic member 33.

As shown in FIG. 2, to facilitate the setting of the locking assembly 30, a handle shell 213 is arranged on the connecting part 212 of the handle 21. The handle shell 213 includes a first handle shell 2131 and a second handle shell 2132 which are connected in butt joints, and the first handle shell 2131 and the second handle shell 2132 are fixedly arranged on the connecting part 212 of the handle 21, which may increase the operating area so as to facilitate operation and to facilitate the setting of the locking assembly 30.

In some embodiments, the handle shell 213 may also be arranged to be integrally formed with the connecting part 212.

As shown in FIG. 2, the handle shell 213 is provided with a key hole 2133 which may be configured to movably set the button member 32. When the button member 32 is arranged in the key hole 2133, the button member 32 may move relative to the handle shell 213. In the present embodiment, the button member 32 is a push button, which may be pushed in a direction parallel to the locking hole 2113. The button member 32 may be shaped as desired in such a way that the button member 32 may be easily pushed or pressed.

As shown in FIG. 2, the locking member 31 is arranged in the handle shell 213 and is linked to the button member 32. When the button member 32 is moved, the locking member 31 is moved synchronously. Two ends of the locking member 31 respectively penetrate through the locking hole 2113 and extend to the outside of two sides of the support arm part 211. The connection between the locking member 31 and the button member 32 may be either fixed or movable, and may be specifically set as desired, as long as the locking member 31 is linked to the button member 32.

As shown in FIG. 2, to facilitate the resetting of the locking member 31, a reset elastic member 33 is arranged between the handle 21 and the button member 32 or the locking member 31. One end of the reset elastic member 33 is abutted against the inner wall of the handle 21 and the other end of the reset elastic member 33 is abutted against the button member 32 or the locking member 31.

In this way, the adjustable buckle apparatus of the present invention is formed: as shown in FIG. 1 to FIG. 8, the shell 11 and the bottom shell 12 are connected in butt joints, and the base 13 is arranged between the shell 11 and the bottom shell 12; a first strap hole 1321 is arranged in the base 13 and is configured to allow the connecting strap 40 to enter and exit. The adjustment assembly 20 includes a handle 21, a strap winding shaft 22 and a follower 23. One end of the handle 21 is rotatably connected to the base 13 by means of a first rotating shaft 50, and the handle 21 rotates around the first rotating shaft 50; the strap winding shaft 22 is transversely arranged between the handles 21, and two ends of the strap winding shaft 22 are respectively arranged in the stroke hole 1312 of the base 13, and the strap winding shaft 22 is movable in the stroke hole 1312 along with the rotation of the handle 21. The follower 23 is rotatably connected to the base 13 and is provided with a second strap hole 232 and a third strap hole 233. The follower 23 may rotate around the first rotating shaft 50 under the action of the connecting strap 40, thereby allowing the stroke path of the connecting strap 40 to change.

As shown in FIG. 3 and FIG. 4, when the strap winding shaft 22 is arranged on the end, far away from the first strap hole 1321, of the stroke hole 1312, the adjustment assembly 20 is in the first position, at this time, the first rotating shaft 50 is arranged between the first strap hole 1321 and the strap winding shaft 22; and the second strap hole 232 is arranged between the first strap hole 1321 and the third strap hole 233.

When the handle 21 is rotated along the direction of the stroke hole 1312, the strap winding shaft 22 moves to the end, adjacent to the first strap hole 1321, of the stroke hole 1312, at this time, as shown in FIG. 5 and FIG. 6, the adjustment assembly 20 is in the second position, the strap winding shaft 22 is arranged between the first strap hole 1321 and the first rotating shaft 50, and the third strap hole 233 is arranged between the first strap hole 1321 and the second strap hole 232.

When in use, the winding manner of the connecting strap 40 may be set as follows:

As shown in FIG. 4 and FIG. 6, one end of the connecting strap 40 penetrates through the first strap hole 1321 and enters into the base 13, penetrates through the second strap hole 232 from the outside of the follower 23 and enters the follower 23, then penetrates through the third strap hole 233, bypasses the strap winding shaft 22 and re-enters the third strap hole 233, and is subsequently led out by the first strap hole 1321.

The working principle of the adjustable buckle apparatus of the present invention is as follows:

In a default state, as shown in FIG. 4, the adjustment assembly 20 is arranged in the first position, i.e., the strap winding shaft 22 is far away from the first strap hole 1321; at this time, the connecting strap 40 is in a relatively free state, and the total length of the connecting strap 40 arranged in the buckle base 10 is the first length. At this time, the connecting strap 40 may be pulled to adjust the tightening degree of the safety seat. During the pulling process of the connecting strap 40, the total length of the connecting strap 40 arranged within the buckle base 10 remains unchanged, but the relative parts change.

Subsequently, the adjustment assembly 20 is moved towards the direction of the first strap hole 1321, the strap winding shaft 22 moves along the stroke hole 1312 to an end adjacent to the first strap hole 1321; the strap winding shaft 22 moves to pull the connecting strap 40, while the connecting strap 40 will act on the follower 23 to cause the follower 23 to also rotate; when the adjustment assembly 20 rotates to the second position, as shown in FIG. 6, the strap winding shaft 22 is then arranged at the end part, adjacent to the first strap hole 1321, of the stroke hole 1312, and the follower 23 rotates to the arc-shaped concave part 234 and corresponds to the strap winding shaft 22. During the rotating process of the follower 23, the stroke distance of the connecting strap 40 within the buckle base 10 will be increased, such that the stroke distance changes from the first length to the second length. Moreover, since the connecting strap 40 bypasses the strap winding shaft 22 and penetrates through the third strap hole 233, therefore, when the adjustment assembly 20 moves to the second position, the connecting strap 40 will be clamped between the strap winding shaft 22 and the arc-shaped concave part 234, such that the connecting strap 40 may not be pulled; however, the increase of the stroke distance of the connecting strap 40 within the buckle base 10 will inevitably shorten the length of the connecting strap 40 outside the buckle base 10. In this way, the connecting strap 40 with a certain slack margin may be tightened between the safety seat and the adjustable buckle apparatus, such that the safety seat may be tightened without shaking.

When the adjustment assembly 20 rotates from the first position towards the second position, the button member 32 is pressed such that the end part of the locking member 31 is positioned inwards without interfering with the rotation of the adjustment assembly 20; when the adjustment assembly 20 moves to the second position, the button member 32 is released and the locking member 31 springs outwards under the action of the reset elastic member 33, such that the end part of the locking member 31 enters the positioning step 1313 and is constrained by the positioning step 1313, thereby keeping the adjustment assembly 20 in the second position.

Since the connecting strap 40 is tightened when the adjustment assembly 20 is in the second position, when the button member 32 is pressed such that the end part of the locking member 31 is withdrawn from the positioning step 1313, the adjustment assembly 20 may rotate towards the direction of the first position under the action of the connecting strap 40, thereby allowing the connecting strap 40 to be in a loosened state.

During practical applications, the adjustable buckle apparatus of the present invention may be set on the connecting strap of the child safety seat. After the length of the connecting strap is roughly adjusted to fix the child safety seat on an automobile seat, the adjustment component of the adjustable buckle apparatus may be turned to the second position to rapidly tighten the connecting strap which originally has a certain slack margin, such that the shaking amplitude of the child safety seat is greatly reduced or the child safety seat does not shake. After several tests, after the adjustable buckle apparatus of the present invention is additionally arranged on the connecting strap, it is basically ensured that the child safety seat does not shake.

Although the present invention is disclosed by means of the above embodiments, the scope of the present invention is not limited thereto and each of the above components may be replaced by similar or equivalent elements known to those skilled in the art without departing from the concept of the present invention.

The invention claimed is:

1. An adjustable buckle apparatus, comprising:
   a buckle base (10), provided with a first strap hole (1321) capable of being penetrated by a connecting strap (40); and
   an adjustment assembly (20), movably arranged on the buckle base (10), wherein in response to the adjustment assembly (20) moving from a first position to a second position, the adjustment assembly (20) is linked to the connecting strap (40) within the buckle base (10) so as to change a stroke length of the connecting strap (40) within the buckle base (10),
   wherein the adjustment assembly (20) comprises:
   a handle (21), with a first end being rotatably connected with the buckle base (10), while a second end extending out of the buckle base (10) for operation, the handle (21) comprising two support arm parts (211) spaced in parallel;
   a strap winding shaft (22), transversely arranged between the two support arm parts (211) and capable of moving along with the handle (21); and
   a follower (23), rotatably connected with the buckle base (10), wherein the follower (23) is provided with a second strap hole (232) and a third strap hole (233) capable of being penetrated by the connecting strap (40).

2. The adjustable buckle apparatus of claim 1, wherein in response to the adjustment assembly (20) being in the first position, the stroke length of the connecting strap (40) within the buckle base (10) is a first length; in response to the adjustment assembly (20) being in the second position, the stroke length of the connecting strap (40) within the buckle base (10) is a second length, and the second length is greater than the first length.

3. The adjustable buckle apparatus of claim 1, wherein the buckle base (10) and/or the adjustment assembly (20) are/is provided with a movably arranged locking assembly (30), in response to the adjustment assembly (20) moving to the second position, the locking assembly (30) keeps the adjustment assembly (20) in a current state.

4. The adjustable buckle apparatus of claim 3, wherein in response to the locking assembly (30) being released, the adjustment assembly (20) is capable of moving towards a direction of the first position under an action of the connecting strap (40) in a tightened state.

5. The adjustable buckle apparatus of claim 1, wherein in response to the adjustment assembly (20) being in the first position, the connecting strap (40) is capable of freely penetrating through the buckle base (10) and the adjustment assembly (20) and is capable of being freely pulled.

6. The adjustable buckle apparatus of claim 1, wherein in response to the adjustment assembly (20) being in the second position, the adjustment assembly (20) is capable of clamping the connecting strap (40), such that the connecting strap (40) is not capable of being freely pulled.

7. The adjustable buckle apparatus of claim 1, wherein in response to being in use, the connecting strap (40) is wound around the strap winding shaft (22) and penetrates through the follower (23); in response to the handle (21) rotating, the strap winding shaft (22) follows a movement of the handle (21) and pulls the connecting strap (40) to rotate the follower (23), and a state of the follower (23) changes such that the stroke length of the connecting strap (40) is increased.

8. The adjustable buckle apparatus of claim 1, wherein the handle (21) and the follower (23) are respectively rotatably connected to the buckle base (10) by means of a first rotating shaft (50); and the first rotating shaft (50) is arranged between the first strap hole (1321) and the strap winding shaft (22) arranged in the first position.

9. The adjustable buckle apparatus of claim 1, wherein a rotating pivot point of the follower (23) is arranged between the first strap hole (1321) and the strap winding shaft (22) arranged in the first position.

10. The adjustable buckle apparatus of claim 1, wherein the buckle base (10) is provided with an arc-shaped stroke hole (1312), the handle (21) is provided with a movable hole (2112), and two ends of the strap winding shaft (22) respectively penetrate through the movable hole (2112) and are arranged in the stroke hole (1312).

11. The adjustable buckle apparatus of claim 1, wherein a button member (32) and a locking member (31) are arranged on the handle (21), and the button member (32) is movably arranged on the handle (21) and is linked to the locking member (31); two ends of the locking member (31) respectively extend out of the handle (21), a positioning step (1313) which is capable of clamping the locking member (31) is arranged at a position, corresponding to the second position, of the buckle base (10), and in response to the adjustment assembly (20) rotating to the second position, an end part of the locking member (31) is capable of being clamped into the positioning step (1313), such that the adjustment assembly (20) is kept in a current state.

12. The adjustable buckle apparatus of claim 11, wherein a reset elastic member (33) is arranged between the handle (21) and the button member (32) or the locking member (31), a first end of the reset elastic member (33) is abutted against an inner wall of the handle (21), and a second end of the reset elastic member (33) is abutted against the button member (32) or the locking member (31); and in response to the button member (32) being pushed towards a direction far away from the strap winding shaft (22), the end part of the locking member (31) exits from the positioning step (1313).

13. The adjustable buckle apparatus of claim 1, wherein in the first position, the second strap hole (232) is arranged between the first strap hole (1321) and the third strap hole (233); and in the second position, the third strap hole (233) is arranged between the first strap hole (1321) and the second strap hole (232).

14. The adjustable buckle apparatus of claim 1, wherein an arc-shaped concave part (234) with a shape matching the strap winding shaft (22) is arranged on the follower (23), in response to the adjustment assembly (20) being in the first position, a position of the strap winding shaft (22) corresponds to the third strap hole (233); and in response to the adjustment assembly (20) being in the second position, the position of the strap winding shaft (22) corresponds to the arc-shaped concave part (234).

15. The adjustable buckle apparatus of claim 1, wherein the adjustment assembly (20) is rotatably arranged on the buckle base (10), and in response to the adjustment assembly (20) rotating from the first position to the second position, the adjustment assembly (20) is stuck at the second position.

* * * * *